H. M. BOBO & H. C. HARRINGTON.
HEAT INDICATOR.
APPLICATION FILED SEPT. 25, 1916.

1,240,813.

Patented Sept. 25, 1917.

Witnesses

H. M. Bobo AND
H. C. Harrington
Inventors by

Attorneys

UNITED STATES PATENT OFFICE.

HIRAM M. BOBO AND HARRY C. HARRINGTON, OF ROME, GEORGIA.

HEAT-INDICATOR.

1,240,813.  Specification of Letters Patent.  Patented Sept. 25, 1917.

Application filed September 25, 1916. Serial No. 122,102.

*To all whom it may concern:*

Be it known that we, HIRAM M. BOBO and HARRY C. HARRINGTON, citizens of the United States, residing at Rome, in the county of Floyd, State of Georgia, have invented a new and useful Heat-Indicator, of which the following is a specification.

This application discloses a novel method of locating a heated area in a pile of material, such as cotton seed, corn, hay and other products which are stored in ware houses, bins, or lofts.

The invention aims, further, to provide a novel apparatus whereby the process above mentioned may be carried out.

It is within the province of the disclosure to improve generally and to enhance the utility of devices and processes of the type to which the present application appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1:
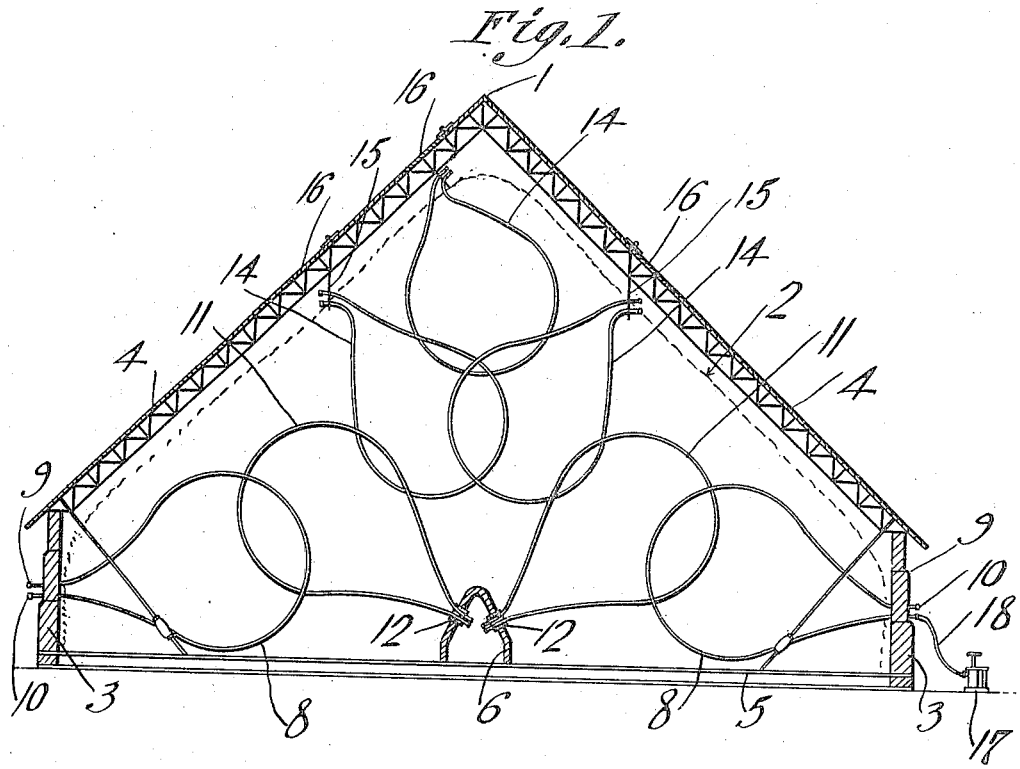
Figure 2:
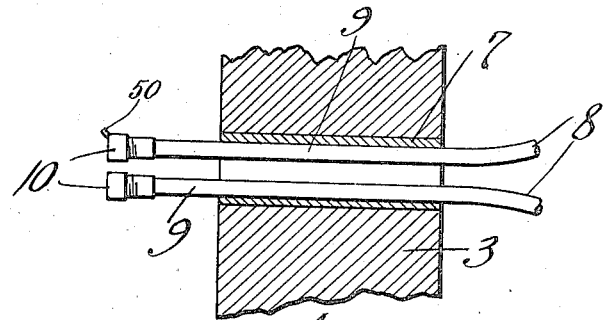

Figure 1 is a cross sectional view showing a portion of a cotton seed ware house in which the present invention is embodied; and Fig. 2 is a fragmental vertical section taken through one of the sides of the ware house.

In the drawings, the numeral 1 indicates a container, in the present instance shown in the form of a cotton seed ware house, the pile of seed in the ware house being denoted by the numeral 2.

The ware house 1 includes side walls 3 which may be made of concrete, and a roof 4. The floor of the ware house 1 is shown at 5. Supported on the floor 5 intermediate the side walls 3 and preferably extended from one end of the ware house to the other is a tunnel 6 which, if desired, may be made of concrete. The tunnel 6 is of sufficient height and breadth so that a person may enter the tunnel. Thimbles 7 are mounted in the side walls 3. The numeral 8 indicates a loop-shaped conduit, the ends 9 of which pass through the thimble 7. The extremities of the conduit 8 are accessible from a point outside of the building, and are closed by removable caps 10. Similar conduits 11 are provided, the same passing through thimbles 12 in the tunnel 6. The ends of the conduits 11 are accessible from within the tunnel 6. In the upper portion of the pile 2 of seed or other material, loop-shaped conduits 14 are placed. These conduits 14 at their ends may be supported as indicated at 15, in any desired manner, from the roof 4, and it will be desirable to provide the roof 4 with trap doors 16, so that the ends of the conduits may be accessible.

The conduits preferably are made of copper tubing, and are of small diameter, the conduits being perhaps, no greater than one-eighth or a quarter of an inch in bore. The conduits are stiff enough so that they will retain, approximately, the looped form shown. The conduits are placed in the pile of seed 2, as the pile is built up.

One cap 10 is mounted on one end of the conduit. By means of a pump 17, some liquid, such as water, is forced into the other end of the conduit through a tube 18, until the conduit is filled. In order to facilitate the egress of air and the filling of the conduit with liquid, the said cap may carry a removable vent plug 50. From time to time, any of the conduits may be opened and the water in the conduits may be permitted to run out, the device 17 being used as an air pump, if desired, to facilitate the ejection of the liquid in the conduit. The operator notes the temperature of the water flowing out of the conduits, either by using a thermometer or by permitting the flowing water to pass over his hand. When the temperature of the outflowing water rises, the operator is advised that some part of the pile 2 of seed is heating. The exact point where this heating is located may be fixed either by timing the flow of the liquid, by measuring the amount of water which runs out, or by weighing the amount of water which is discharged. The conduits are of a fixed length, and of a known cross section, so that, by the procedure above indicated, the exact point of heating in the pile 2 may be located.

It is to be understood that the arrangement of conduits shown in Fig. 1 may be duplicated as many times as desired, between the ends of the ware house or other container 1.

Having thus described the invention, what is claimed is:—

1. The herein described method of locating a heated area in a pile of material, having embedded therein a conduit the length of which is known and the cross section of which is constant; such method consisting in filling the conduit with liquid which is allowed to become heated by the pile; then permitting the liquid to run out of the conduit; noting the point in the flow at which the temperature of the liquid rises; and noting the amount of discharge before such point is reached, to locate the place of heating in the pile.

2. The herein described method of locating a heated area in a pile of material, having embedded therein a conduit the length of which is known and the cross section of which is constant; such method consisting in filling the conduit with liquid which is allowed to become heated by the pile; then permitting the liquid to flow out of the conduit; noting the point in the flow at which the temperature of the liquid rises; and noting the time that elapses between the beginning of the flow and the discharge of heated liquid thereby to locate the place of heating in the pile.

3. The herein described method of locating a heated area in a pile of material, having embedded therein a conduit the length of which is known and the cross section of which is constant; such method consisting in filling the conduit with liquid which is allowed to become heated by the pile; then permitting the liquid to run out of the conduit; noting the point in the flow at which the temperature of the liquid rises; and weighing the liquid discharged, to locate the place of heating in the pile.

In testimony that we claim the foregoing as our own, we have hereto affixed our signatures in the presence of two witnesses.

HIRAM M. BOBO.
HARRY C. HARRINGTON.

Witnesses:
J. D. KAY,
K. G. SEATON.

Copies of this patent may be obtained for five cents each, by addressing the "Commissioner of Patents, Washington, D. C."